United States Patent
Nagata

(10) Patent No.: US 12,024,154 B2
(45) Date of Patent: Jul. 2, 2024

(54) REMOTELY CONTROL IN-CABIN FEATURES

(71) Applicant: Toyota Motor Engineering & Manufacturing North America, Inc., Plano, TX (US)

(72) Inventor: Katsumi Nagata, Foster City, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 501 days.

(21) Appl. No.: 17/149,593

(22) Filed: Jan. 14, 2021

(65) Prior Publication Data
US 2022/0219666 A1    Jul. 14, 2022

(51) Int. Cl.
| | |
|---|---|
| B60W 10/30 | (2006.01) |
| B60H 1/00 | (2006.01) |
| B60R 25/01 | (2013.01) |
| B60R 25/24 | (2013.01) |
| G01C 21/00 | (2006.01) |
| G06F 3/0482 | (2013.01) |
| G07C 5/08 | (2006.01) |
| H04W 4/48 | (2018.01) |

(52) U.S. Cl.
CPC ......... *B60W 10/30* (2013.01); *B60H 1/00657* (2013.01); *B60R 25/01* (2013.01); *B60R 25/24* (2013.01); *G07C 5/0816* (2013.01); *H04W 4/48* (2018.02); *B60W 2556/45* (2020.02); *G01C 21/3885* (2020.08); *G06F 3/0482* (2013.01)

(58) Field of Classification Search
CPC .............. B60W 10/30; B60W 2556/45; B60H 1/00657; B60R 25/01; B60R 25/24; G07C 5/0816; G07C 9/00309; H04W 4/48; H04W 4/024; G01C 21/3885; G01C 21/3661; G06F 3/0482; B60K 2370/566; B60K 2370/573; B60K 35/00
See application file for complete search history.

(56) References Cited

U.S. PATENT DOCUMENTS

| | | | | |
|---|---|---|---|---|
| 9,348,492 | B1 * | 5/2016 | Penilla | G06F 3/04842 |
| 2020/0254875 | A1 * | 8/2020 | Strandberg | B60K 37/06 |
| 2021/0316754 | A1 * | 10/2021 | Bielby | B60W 10/18 |

OTHER PUBLICATIONS https://www.apple.com/ios/carplay/.

* cited by examiner

*Primary Examiner* — Tyler J Lee
*Assistant Examiner* — Kimia Kohankhaki
(74) *Attorney, Agent, or Firm* — Snell & Wilmer LLP

(57) ABSTRACT

Methods, systems, and apparatus for an infotainment system. The infotainment system includes a first mobile device and an in-vehicle infotainment platform. The in-vehicle infotainment platform includes an electronic control unit. The electronic control unit is configured to receive, from the first mobile device, a first request to control, adjust or manage a first vehicle component. The electronic control unit is configured to receive, from the first mobile device, a second request to control, adjust or manage a second vehicle component. The electronic control unit is configured to control, adjust or manage the first vehicle component based on the first request. The electronic control unit is configured to control, adjust or manage the second vehicle component based on the second request.

20 Claims, 7 Drawing Sheets

REMOTELY CONTROL IN-CABIN FEATURES

BACKGROUND

Field

This disclosure relates to using a mobile device to allow occupants of the vehicle to manage or control various in-cabin features of the vehicle.

Description of the Related Art

Mobile applications on mobile phones or other personal devices provide increased functionality to users in various applications including while driving or in the vehicle. For example, some vehicle platforms connect or couple with a user's personal device to display or link the user's personal device with the in-vehicle infotainment system to display navigation information on the in-vehicle infotainment system or to stream music through the media center. Typically, the in-vehicle infotainment system is coupled or paired with a single user's personal device, and requires that an application on the in-vehicle infotainment system to interact with a corresponding application on the user's personal device to perform a specific functionality. The functionality, however, is limited to a single function of the user's personal device, e.g., making a phone call, displaying navigation information, playing music and/or sending Short Messaging Service (SMS) message or text message, which may be displayed on the head unit or dashboard display or played through the vehicle's audio system. That is, the personal device that is coupled or paired with the in-vehicle infotainment system may only control a single function at a time and only a single personal device may couple or pair with the in-vehicle infotainment system.

Accordingly, there is a need for a system, platform and method for increased simultaneous control of vehicle functions by multiple personal devices.

SUMMARY

In general, one aspect of the subject matter described in this disclosure may be embodied in an infotainment system for a vehicle. The infotainment system includes a first mobile device and an in-vehicle infotainment platform. The in-vehicle infotainment platform includes an electronic control unit. The electronic control unit is configured to receive, from the first mobile device, a first request to control, adjust or manage a first vehicle component. The electronic control unit is configured to receive, from the first mobile device, a second request to control, adjust or manage a second vehicle component. The electronic control unit is configured to control, adjust or manage the first vehicle component based on the first request. The electronic control unit is configured to control, adjust or manage the second vehicle component based on the second request.

These and other embodiments may optionally include one or more of the following features. The first request may be a request to change an ambient temperature within a passenger cabin of the vehicle. The first component may be a heating, ventilation and air conditioning (HVAC) unit of the vehicle. The electronic control unit may be configured to increase or decrease the ambient temperature within the passenger cabin. The second request may be a request to unlock or lock one or more doors, control a setting on a media center of the vehicle or open or close one or more windows. The second vehicle component may be one or more doors, the media center or the one or more windows. The electronic control unit may be configured to unlock or lock the one or more doors, control the setting on the media center or open or close the one or more windows.

The first request may include an identifier that identifies that the first vehicle component is to be controlled, adjusted or managed and a setting or a configuration to configure the first vehicle component. The electronic control unit may be configured to extract the identifier and the setting or configuration to configure the first vehicle component. The electronic control unit may be configured to control, adjust or manage the first vehicle component based on the setting or configuration. The request may be a request to render an image on the first vehicle component, and the electronic control unit may be configured to render the image on the display. The in-vehicle infotainment system may include a second mobile device. The electronic control unit may be configured to receive from the second mobile device a third request to control the first vehicle component.

In another aspect, the subject matter may be embodied in an in-vehicle infotainment system for a vehicle. The in-vehicle infotainment system includes multiple mobile devices including a first mobile device and a second mobile device. The in-vehicle infotainment system includes an in-vehicle infotainment platform. The in-vehicle infotainment platform includes a processor. The processor is configured to receive, from the first mobile device, a first request that identifies a first vehicle component to control and a first setting. The processor is configured to receive, from the second mobile device, a second request that identifies a second vehicle component to control and a second setting. The processor is configured to control the first vehicle component based on the first setting and control the second vehicle component based on the second setting.

In another aspect, the subject matter may be embodied in a method for controlling an in-vehicle infotainment unit of a vehicle. The method includes obtaining, by a processor and from the first mobile device, a first request to control a first vehicle component. The method includes obtaining, by the processor and from the first mobile device, a second request to control a second vehicle component. The method includes controlling, by the processor, the first vehicle component based on the first request. The method includes controlling, by the processor, the second vehicle component based on the second request.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, devices, apparatuses, platforms and/or methods for controlling vehicle components. Particular embodiments of the subject matter described in this disclosure may be implemented to realize one or more of the following advantages. The in-vehicle infotainment system ("infotainment system") allows a single user or multiple users, such as the driver of the vehicle or other occupant of the vehicle, to access and control various functions of one or more vehicle components of the vehicle and also to monitor the one or more vehicle components in real-time. The infotainment system allows a user and/or multiple users to simultaneously, concurrently or sequentially access and control multiple vehicle components and also obtain status information of the one or more vehicle components via a personal device, such as a mobile phone, to conveniently share information among the occupants of the vehicle and/or adjust various settings of the one or more vehicle components from the comfort of their seat while in the vehicle. For example, a driver may use an application on their mobile phone to control the heating, ventilation and air conditioning (HVAC) unit to increase or decrease a temperature within a passenger cabin of the vehicle. And, in another example, the rear passenger may use the application on their mobile phone to control the display to show the driver and front passenger a review or location of a restaurant, a map and/or another resource, such as a webpage that is being viewed by the rear passenger.

Other benefits and advantages include the capability to maintain and have different user profiles for each user of the infotainment system. By having different user profiles for each user, the infotainment system may limit the access and control of the various vehicle components or functions of the vehicle components based on the user. For example, the driver may have administrative privileges that allow the driver to control all functions, while a rear passenger may have only user privileges that allow the rear passenger to control the media center and/or the rear cabin temperature.

Additionally, the infotainment system allows for multiple users to simultaneously control various vehicle functions. For example, the infotainment system may allow the driver using a first mobile device to control a first vehicle component, such as a window, while simultaneously allowing the rear passenger using a second mobile device to control a second vehicle component, such as the media center. This allows for the remote and simultaneous control of multiple vehicle components by multiple users.

Figure 1:
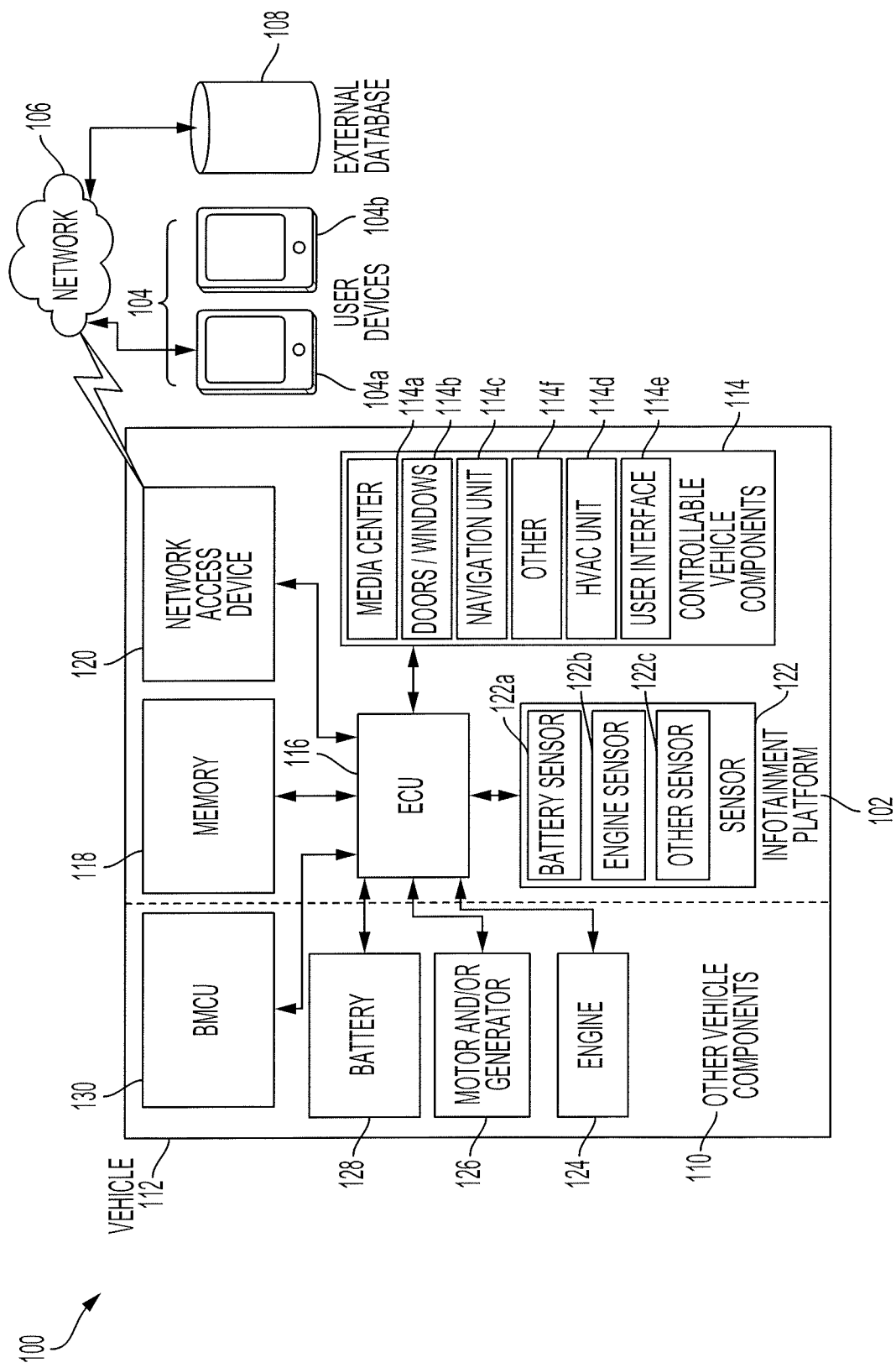
FIG. 1 is a block diagram of an example in-vehicle infotainment system according to an aspect of the invention.

FIG. 1 is a block diagram of an infotainment system 100. The infotainment system 100 includes an infotainment platform 102 and/or one or more user devices 104. The infotainment system 100 may couple, connect to, or include an external database 108 and/or one or more other vehicle components 110 of the vehicle 112. The infotainment system 100 may have a network 106 that links the infotainment platform 102, the one or more user devices 104, and/or one or more other vehicle components 110. The network 106 may be a local area network (LAN), a wide area network (WAN), a cellular network, the Internet, or combination thereof, that connects, couples and/or otherwise communicates between the various components of the infotainment system 100, such as the infotainment platform 102, the one or more user devices 104, the one or more other vehicle components 110 and/or the external database 108.

The infotainment system 100 includes an infotainment platform 102. The infotainment platform 102 processes various requests from the one or more user devices 104 that indicate commands and/or access requests to control various settings of one or more vehicle components of the vehicle 112. The infotainment platform 102 may also aggregate and collect status information from the one or more vehicle components of the vehicle 112 to share or provide the status information to the one or more user devices 104 to display or otherwise provide the status information to the driver and/or passengers within the vehicle 112.

The infotainment platform 102 may process a request from a user, determine whether the request is valid, determine whether the user that sent the request has access rights to control the vehicle component indicated in the access request and/or reconfigures, controls or adjusts settings of the vehicle component. The infotainment platform 102 may communicate with and/or among the one or more user devices 104, the external database 108 and/or the other vehicle components 110 to share and provide status information related to the various vehicle components and/or share and provide other resources.

The user may be a driver, passenger or other occupant of the vehicle 112. The request may be made in real-time or may be scheduled. The request may be sent from the one or more user devices 104 to the infotainment platform 102 to control one or more controllable vehicle components 114 and/or one or more other vehicle components 110. The infotainment platform 102 may receive a single request or multiple requests from a single user device 104a-b and/or from multiple user devices 104a-b, concurrently, simultaneously and/or over a period of time to control a single vehicle component or multiple vehicle components.

The infotainment platform 102 has a processor, such as an electronic control unit 116, a memory 118, a network access device 120 and/or one or more controllable vehicle components 114. The infotainment platform 102 includes a processor that is programmed to receive various requests from one or more user devices 104. The processor is coupled to the memory 118 and executes instructions stored within the memory 118. The processor may extract one or more commands from the various requests and control one or more controllable vehicle components 114 based on the requests. For example, the processor may extract a command to open or close one or more windows and/or one or more doors.

The one or more controllable vehicle components 114 may include a media center 114a, one or more doors or windows 114b, a navigation unit 114c, a heating, ventilation, and air conditioning (HVAC) unit 114d, a user interface 114e and/or one or more other controllable vehicle components 114f, such as interior lights, speakers, microphones or other components of the vehicle 112. The media center 114a may include the audio, video and/or multimedia system of the vehicle, such as one or more speakers, a television or other video display, a radio and/or other multimedia components. The one or more doors or windows 114b may include the sun/moon roof, the front and rear driver-side and passenger-side windows and/or doors, and/or tailgate. The HVAC unit 114*d* may include the heater, defroster, vent, and/or air conditioner. The one or more other controllable vehicle components 114*f* may include one or more windshield wipers, one or more mirrors, one or more lights within the vehicle 112 and/or other controllable vehicle components 114*f*.

The infotainment platform 102 may include the navigation unit 114*c*. The navigation unit 114*c* may be integral to the vehicle 112 or a separate unit coupled to the vehicle 112, such as a personal device with navigation capabilities. When the navigation unit 114*c* is separate from the vehicle 112, the navigation unit 114*c* may communicate with the vehicle 112 via the network access device 120. In some implementations, the vehicle 112 may include a Global Positioning System (GPS) unit (not shown) for detecting location data including a current location of the vehicle 112 and date/time information instead of the navigation unit 114*c*. In that regard, the ECU 116 may perform the functions of the navigation unit 114*c* based on data received from the GPS unit. At least one of the navigation unit 114*c* or the ECU 116 may predict or propose a route set that includes a starting location and a destination location. The navigation unit 114*c* or the ECU 116 may perform navigation functions. Navigation functions may include, for example, route and route set prediction, providing navigation instructions, and receiving user input such as verification of predicted routes and route sets or destinations. Other information, such as a current speed of the vehicle 112, may be extrapolated, interpreted or otherwise calculated from the data obtained from the navigation unit.

The navigation unit 114*c* may provide and obtain navigational map information including location data, which may include a current location, a starting location, a destination location and/or a route between the starting location or current location and the destination location of the vehicle 112. The navigational map information may include entity information. The entity information may include locations or places of interest, such as government buildings, commercial businesses, schools, tourist attractions, restaurants or other places of interest, and their corresponding locations. The navigation unit 114*c* may include a memory (not shown) for storing the route data. The navigation unit 114*c* may receive data from other sensors capable of detecting data corresponding to location information. For example, the other sensors may include a gyroscope or an accelerometer.

The infotainment platform 102 may include one or more sensors 122 and/or one or more other vehicle components 110. The processor may obtain sensor data and/or status information from the one or more sensors 122 that are related to the one or more other vehicle components 110. The processor may provide the obtained sensor data and/or the status information to the one or more user devices 104. For example, the infotainment platform 102 may use a battery sensor to determine the state of charge of the battery 128.

The one or more sensors 122 may include a battery sensor 122*a*, an engine sensor 122*b* and/or one or more other sensors 122*c*. The battery sensor 122*a* may measure a state of charge of the battery 128. The engine sensor 122*b* may measure a state of the engine 124. The one or more sensors 122 may include one or more other sensors 122*c*. The one or more other sensors 122*c* may be a temperature sensor to measure the ambient temperature within the cabin of the vehicle 112, a condensation sensor to measure an amount of condensation on the one or more windows and/or a fuel cell sensor to measure an amount of fuel within the fuel tank of the vehicle 112.

The processor may be coupled to the memory 118. The memory 118 may store one or more user profiles. The one or more user profiles may define different access privileges for different users. The different access privileges define the functions and/or vehicle components that the user may either control, access and/or manage and/or the type of status information and/or sensor data that may be shared or provided to the one or more user devices 104 via the network access device 120. The network access device 120 communicates with the other components, such as the one or more user devices 104 and/or the external database 108.

The infotainment platform 102 may be included within, retrofitted to and/or coupled to the vehicle 112. A vehicle 112 is a conveyance capable of transporting a person, an object, or a permanently or temporarily affixed apparatus. The vehicle 112 may be a self-propelled wheeled conveyance, such as a car, sports utility vehicle, truck, bus, van or other motor or battery driven or fuel cell driven vehicle. For example, the vehicle 112 may be an electric vehicle, a hybrid vehicle, a hydrogen fuel cell vehicle, a plug-in hybrid vehicle or any other type of vehicle that has a fuel cell, a motor and/or a generator 126. Other examples of vehicles include bicycles, trains, planes, or boats, and any other form of conveyance that is capable of transportation. The vehicle 112 may be semi-autonomous or autonomous. That is, the vehicle 112 may be self-maneuvering and navigate without human input. An autonomous vehicle may have and use one or more sensors 122 and/or navigation unit 114*c* to drive autonomously.

The infotainment system 100 may include one or more other vehicle components 110 that may be coupled to, included within and/or retro-fitted to the infotainment platform 102. The one or more other vehicle components 110 may include a motor and/or generator 126, the battery 128, the engine 124 and/or the battery management control unit (BMCU) 130.

The motor and/or generator 126 may convert electrical energy into mechanical power, such as torque, and may convert mechanical power into electrical energy. The motor and/or generator 126 may be coupled to the battery 128. The motor and/or generator 126 may convert the energy from the battery 128 into mechanical power, and may provide energy back to the battery 128, for example, via regenerative braking. In some implementations, the vehicle 112 may include one or more additional power generation devices such as the engine 124 or a fuel cell stack (not shown). The engine 124 combusts fuel to provide power instead of and/or in addition to the power supplied by the motor and/or generator 126.

The battery 128 may be coupled to the motor and/or generator 126 and may provide electrical energy to and receive electrical energy from the motor and/or generator 126. The battery 128 may include one or more rechargeable batteries.

The BMCU 130 may be coupled to the battery 128 and may control and manage the charging and discharging, of the battery 128. The BMCU 130, for example, may measure, using battery sensors, parameters used to determine the state of charge (SOC) of the battery 128. The BMCU 130 may control the battery 128.

Figure 2:
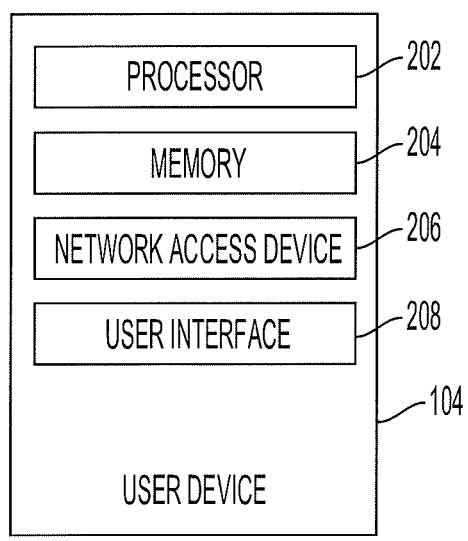
FIG. 2 is a block diagram of an example user device of the infotainment system of FIG. 1 according to an aspect of the invention.

The infotainment system 100 includes one or more user devices 104. The one or more user devices 104 may be a personal device, such as a laptop, a computer, a smartphone or other computing device. The one or more user devices 104 include a processor 202, a memory 204, a network access device 206 and/or a user interface 208, as shown in FIG. 2 for example. The processor 202 may be coupled to the memory 204 and execute instructions stored within the memory 204. The memory 204 may store one or more software mobile applications that interact with the infotainment platform 102 to control one or more controllable vehicle components 114 and/or receive sensor data and/or status information of one or more other vehicle components 110 via the network access device 206. The one or more user devices 104 may have a user interface 208 that receives user input from a user that defines the request to control or manage one or more components of the vehicle and/or to provide output to the user, such as one or more notifications, alerts or other information related to the vehicle components.

The one or more processors, such as the ECU 116 and/or the processor 202, may each be implemented as a single processor or as multiple processors. The one or more processors may be electrically coupled to, connected to or otherwise in communication with the corresponding memory 118, 204 and/or network access devices 120, 206 and/or user interfaces 114e, 208 on the respective device, such as the infotainment platform 102 or the one or more user devices 104.

The one or more memories 118, 204 may be coupled to the one or more processors and store instructions that the processors execute. The one or more memories 118, 204 may include one or more of a Random Access Memory (RAM) or other volatile or non-volatile memory. The one or more memories 118, 204 may be a non-transitory memory or a data storage device, such as a hard disk drive, a solid-state disk drive, a hybrid disk drive, or other appropriate data storage, and may further store machine-readable instructions, which may be loaded and executed by the one or more processor. Moreover, the one or more memories 118, 204 may be used to store different profiles for the user, such as the different occupant of the vehicle 112, or device.

The one or more network access devices 120, 206 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The one or more network access devices 120, 206 may transmit data to and receive data between the one or more user devices 104 and the infotainment platform 102. For example, the ECU 116 may communicate with the one or more user devices 104 to obtain requests to control or adjust one or more configurations or settings of the one or more controllable vehicle components 114 and/or receive status information and/or sensor data from the one or more other vehicle components 110.

Figure 4:
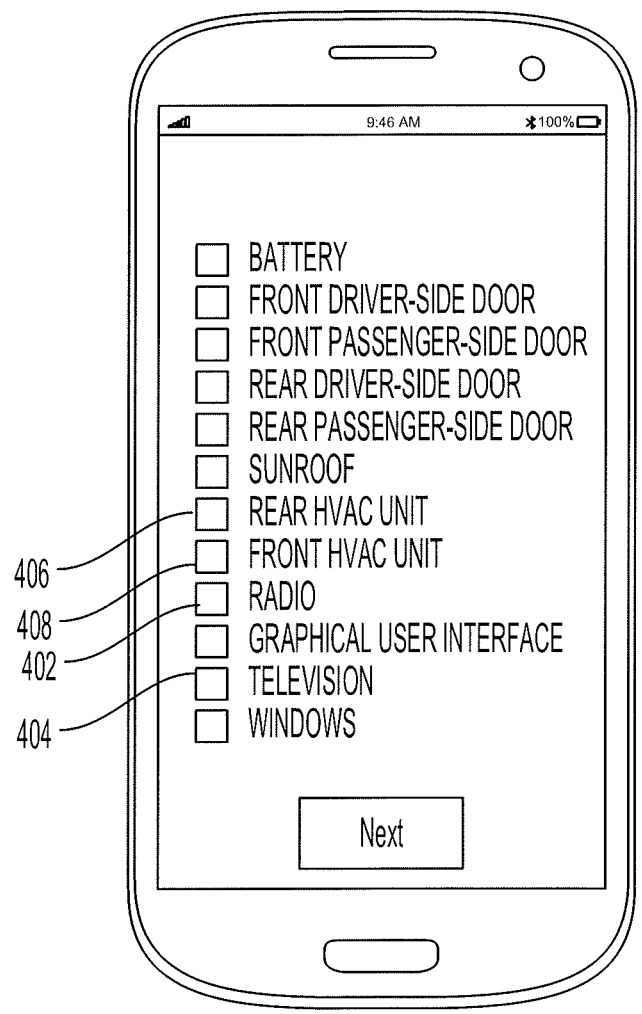
FIG. 4 shows an example display of the user interface of one or more user devices to perform selection of the one or more vehicle components to control using the infotainment system of FIG. 1 according to an aspect of the invention.

The one or more user interfaces 114e, 208 may display one or more notifications, alerts, menus, maps, webpages or other resources on one of the one or more user interfaces 114e, 208. The one or more menus may display an option to select one or more vehicle components to control or to obtain sensor data and/or sensor information to provide to the user, as shown in FIG. 4 for example. The one or more user interfaces 114e, 208 may include an input/output device that receives user input from a user interface element, a button, a dial, a microphone, a keyboard, or a touch screen. For example, the user interface 208 may receive user input that may include configurations or settings for the HVAC unit 114d to set an ambient temperature within the cabin of the vehicle 112, e.g., to increase or decrease the ambient temperature within the cabin of the vehicle 112. Other configurations may include a volume or channel on the radio or television and/or a position of the one or more doors or windows 114b, for example. The one or more user interfaces 114e, 208 may provide an output to an output device, such as a display, a speaker, an audio and/or visual indicator, or a refreshable braille display. For example, the user interface 208 may display the state of charge of the battery 128 and/or the amount of fuel remaining on a user display.

The infotainment system 100 may include an external database 108. A database is any collection of pieces of information that is organized for search and retrieval, such as by a computer, and the database may be organized in tables, schemas, queries, reports, or any other data structures. A database may use any number of database management systems. The external database 108 may include a third-party server or website that stores or provides information. The information may include real-time information, periodically updated information, or user-inputted information. A server may be a computer in a network that is used to provide services, such as accessing files or sharing peripherals, to other computers in the network.

The external database 108 may be a relational database. The external database 108 may be updated and/or provide updates in real-time. The external database 108 may provide one or more resources, such as a webpage and/or navigational map information, to the one or more user devices 104 and/or the infotainment platform 102 to render the one or more resources on the one or more user interfaces 114e, 208. The external database 108 may also store other information, such as entity information. The entity information may include the location of various entities, such as restaurants, businesses or other places of interest, surrounding the vehicle 112.

Figure 3:
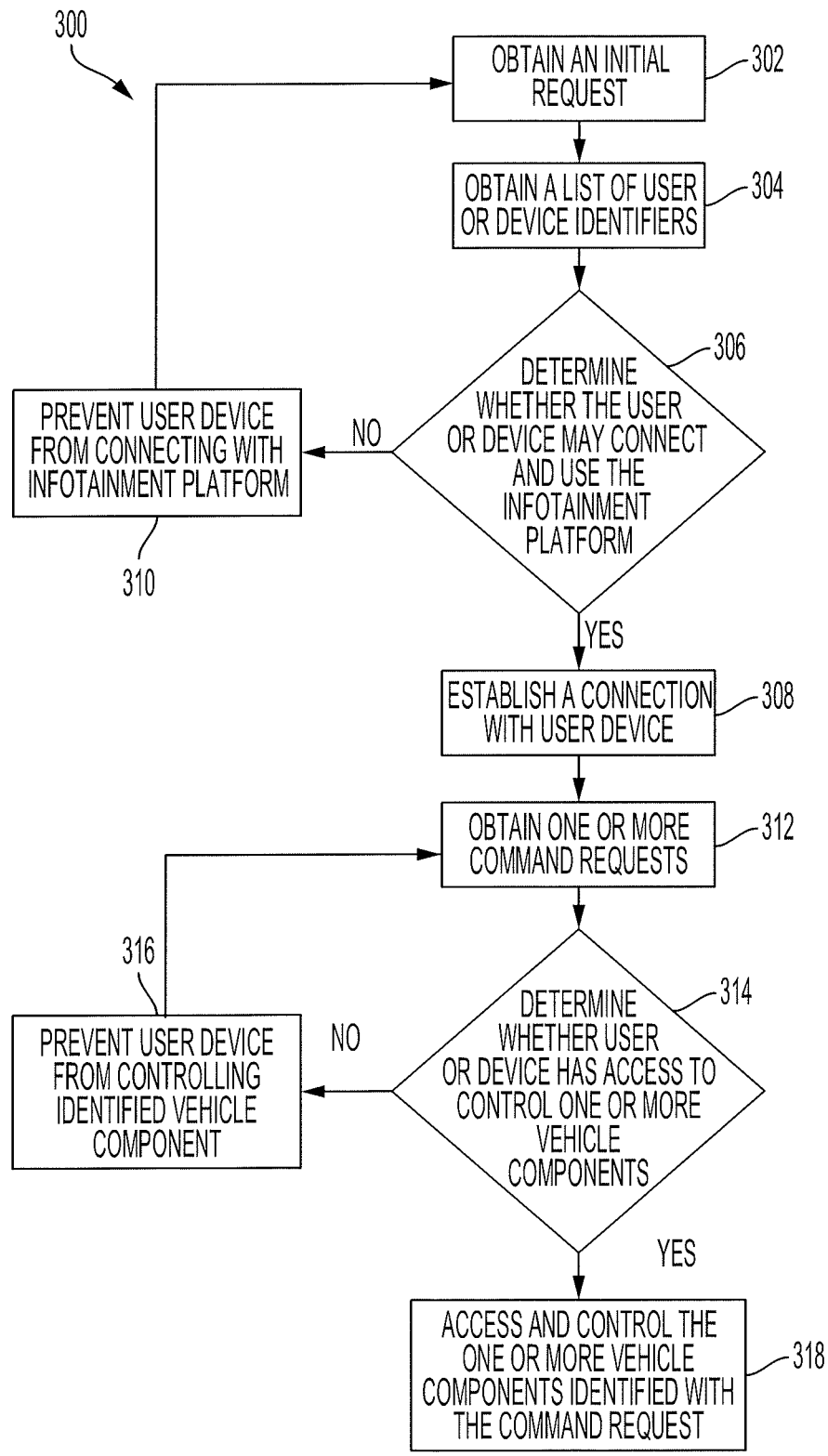
FIG. 3 is a flow diagram of an example process for controlling one or more vehicle components using the infotainment system of FIG. 1 according to an aspect of the invention.

FIG. 3 is a flow diagram of a process 300 for controlling one or more vehicle components of the vehicle using one or more user devices 104. One or more computers or one or more data processing apparatuses, for example, the electronic control unit 116 and/or the processor 202 of the infotainment system 100 of FIG. 1, appropriately programmed, may implement the process 300.

The infotainment platform 102 obtains an initial request from the one or more user devices 104 to connect with the infotainment platform 102 (302). An initial request is a request to connect with the infotainment platform 102 to control one or more vehicle components. The infotainment platform 102 may receive a single initial request from a single user device to form a single session between the infotainment platform 102 and the user device 104a-b or may receive multiple initial requests from different user devices to form multiple different sessions between the infotainment platform 102 and multiple user devices 104a-b.

The initial request may include a user or device identifier. The user or device identifier may indicate a user, which may be matched to a user profile, or a user device 104a-b, which may be matched to a device profile, that has issued the request. The infotainment platform 102 may use the user or device identifier to determine the privileges of the user or the user device associated with the user or device identifier. The privileges limit, manage or otherwise determine the settings and the vehicle components that the user or the user device may control, change, view and/or access.

The infotainment platform 102 obtains a list of user or device identifiers (hereinafter, the "list") that may control, manage or otherwise access the one or more vehicle components of the vehicle 112 (304). The infotainment platform 102 may obtain the list from the memory 118 and/or from the external database 108. The list may indicate the users and/or devices that may access the one or more vehicle components along with a corresponding user or device profile. The user or device profile identifies the corresponding privileges that the user or device has access. The privileges may correspond to vehicle components and/or settings or configurations that adjust the corresponding vehicle components that the user or device may control, manage, view or otherwise access. For example, the list identifiers may indicate that User A or Device A may access the HVAC Unit 114*d*, the navigation unit 114*c*, the media center 114*a*, the user interface 114*e* and/or the one or more sensors 122 but not the one or more doors and/or windows 114*b*. The list may also indicate that User A or Device A may change the change temperature settings to the HVAC Unit 114*d* for the rear passenger cabin of the vehicle 112 but not the front passenger cabin of the vehicle 112, change the volume or channels of the rear television of the media center 114*a* but not the radio, share the resource displayed on the one or more user interfaces 114*e*, 208 and/or obtain sensor data or status information from the one or more sensors 122. In another example, the list may indicate that User B or Device B may lock or unlock one or more doors and/or windows 114*b*. The list may also indicate that User B or Device B may only control or access the rear doors and/or windows 114*b* but not the front doors and/or windows 114*b*.

The infotainment platform 102 may determine whether the user or device may connect and use the infotainment platform 102 (306). The infotainment platform 102 extracts the extract the user or device identifier from the initial request. The infotainment platform 102 may parse the initial request based on a formatting of the initial request or a flag within the initial request to extract the user or device identifier from the initial request. The infotainment platform 102 compares the user or device identifier to the one or more users or devices in the list.

If the user or device identifier matches one of the one or more users or devices in the list, the infotainment platform 102 determines that the user or device may control one or more vehicle components and establishes a connection with the user device 104*a-b* that sent the request (308). The infotainment platform 102 associates the user or device identifier and the matched user or device to a corresponding user or device profile, which includes the privileges that the user or device has access too. The infotainment platform 102 may use the user or device profile to determine the one or more vehicle components that the user or device may access. This ensures that only users and devices that are valid and authenticated access the one or more vehicle components.

Otherwise, if the user or device identifier does not match one of the one or more users or devices in the list, the infotainment platform 102 prevents the user device 104*a-b* that sent the initial request from connecting with the infotainment platform 102 (310). The infotainment platform 102 may send a notification that indicates the failure to connect to the user device 104*a-b* that sent the initial request. The infotainment platform 102 may continue to monitor for one or more initial requests from the one or more user devices 104*a-b*. This prevents the user device 104*a-b* from accessing and/or controlling the one or more vehicle components.

Once the infotainment platform 102 connects and establishes a connection with the one or more user devices 104*a-b*, the infotainment platform 102 receives or obtains one or more command requests to control the one or more vehicle components (312). The infotainment platform 102 may obtain the one or more command requests from one or more user devices 104 that have connected with the infotainment platform 102. The one or more command requests from the one or more user devices 104 may be sent manually by the user or automatically based on the preset conditions and/or user's preferences.

The infotainment platform 102 may obtain a single command request from a single user device, such as a single command request from a primary user device 104*a* or a single command request from a secondary user device 104*b*, a single command request from each of the multiple user devices 104*a-b* and/or multiple command requests from a single user device 104*a-b*. Each command request may be a request to control a different or the same vehicle component. In some implementations, the command request may be a request to control multiple vehicle components simultaneously, concurrently and/or sequentially.

For example, a first command request may control a setting on the media center 114*a* and the second command request may control a setting on the navigation unit 114*c* or both command requests may control a setting on the media center 114*a*. Moreover, the one or more command requests may come from a single user device or from different user devices, such as a primary user device 104*a* and a secondary user device 104*b*. A primary user device 104*a* may be a user device that has more access and control privileges than a secondary user device 104*b*. The primary device 104*a* may be associated with a user profile of a driver or other occupant that is allowed to have more control over a larger number of vehicle components. For example, the primary user device 104*a* may have access to and the ability to control each setting of each of the one or more controllable vehicle components 114 while also receiving sensor data and/or status information related to the one or more other vehicle components 110. The secondary device 104*b* may be associated with a user profile of a different occupant, such as a rear passenger, that is allowed to have less control in comparison to the user of the primary user device 104*a*. The secondary device 104*b* may be limited to less settings that may be controlled and/or a smaller number of vehicle components that may be controlled. For example, the secondary user device 104*b* may only have access to and the ability to control each setting of a particular set of vehicle components, such as the media center 114*a*, the rear HVAC unit that controls the ambient temperature in the rear passenger cabin of the vehicle 112 and/or the rear doors and/or windows.

The command request may include a vehicle component identifier and/or one or more settings or configurations of the vehicle component associated with the vehicle component identifier and/or a command or task. For example, a user on the user device 104*a* may choose from a selection of one or more controllable vehicle components 114, such as the radio or television of the media center 114*a*, the various doors and/or windows 114*b*, the battery 128 and/or the rear HVAC unit and/or the front HVAC unit of the HVAC unit 114*d*, on the user device 104*a-b* to control and/or to monitor. The user may select one or more user interface elements 402, 404, 406, 408 that correspond to the various vehicle components, such as the radio, television, rear HVAC unit and/or the front HVAC unit, respectively, as shown in FIG. 4 for example. The selection of the one or more controllable vehicle components 114 is associated with a vehicle component identifier that may be transmitted with the command request to the infotainment platform 102.

The vehicle component identifier identifies the vehicle component that the user device 104*a-b* intends to control or obtain sensor data and/or status information from. The command or task identifies the action to be taken upon the vehicle component identified by and/or associated with the vehicle component identifier, and controls, adjusts or manages the vehicle component according to the one or more settings or configurations that indicate the end state of the vehicle component.

For example, the vehicle identifier may indicate the HVAC unit 114*d*, the command or task may indicate to increase, decrease or otherwise set the temperature of the air within the cabin of the vehicle, and the one or more settings or configurations indicate a target temperature, such as 78° F., that is the end state of the change in the temperature. In another example, the vehicle component identifier may indicate the one or more doors and/or windows 114*b*, the command or task may indicate to raise or lower one or more windows, and the one or more settings or configurations may be a target position, such as a half-open window, that is the end state of the change in raising or lowering of the one or more windows.

The various vehicle components that may be controlled, managed, monitored or otherwise accessed include the media center 114*a*, the one or more doors and/or windows 114*b*, the navigation unit 114*c*, the HVAC unit 114*d* including the front HVAC unit and/or the rear HVAC unit, the user interface 114*e* and/or other controllable vehicle components 114*f*. The various vehicle components that may be monitored via the one or more sensors 122 include the battery 128 via the battery sensor 122*a* and the engine 124 via the engine sensor 122*b*.

The infotainment platform 102 determines whether the user or device has access to control the one or more vehicle components (314). The infotainment platform 102 may compare the command request to the user or device profile associated with the user or device that is connected to the infotainment platform. The infotainment platform 102 may extract the vehicle component identifier and/or the one or more settings or configurations and may compare the vehicle component identifier and/or the one or more settings or configurations to the privileges within the user or device profile, which defines the vehicle components and the configuration settings a user or device may access and/or control. If the privileges within the user or device profile indicate that the user or device may not access and/or control the vehicle component and/or the one or more settings or configurations, the infotainment platform 102 may prevent access to the vehicle component and/or send an alert to the one or more user interfaces 114*e*, 208 (316). The infotainment platform 102 may continue to monitor for one or more command requests.

If the privileges within the user or device profile indicate that the user or device may access and/or control the vehicle component associated with the vehicle component identifier and the one or more settings or configurations, the infotainment platform 102 allows the user or device to access and/or control the vehicle component (318). The infotainment platform 102 may send one or more control signals to the corresponding vehicle component identified by the vehicle component identifier. The one or more control signals may cause the vehicle component to act on the command or task to adjust the vehicle component specified by the vehicle component identifier to the one or more settings or configurations specified in the command request.

Figure 5:
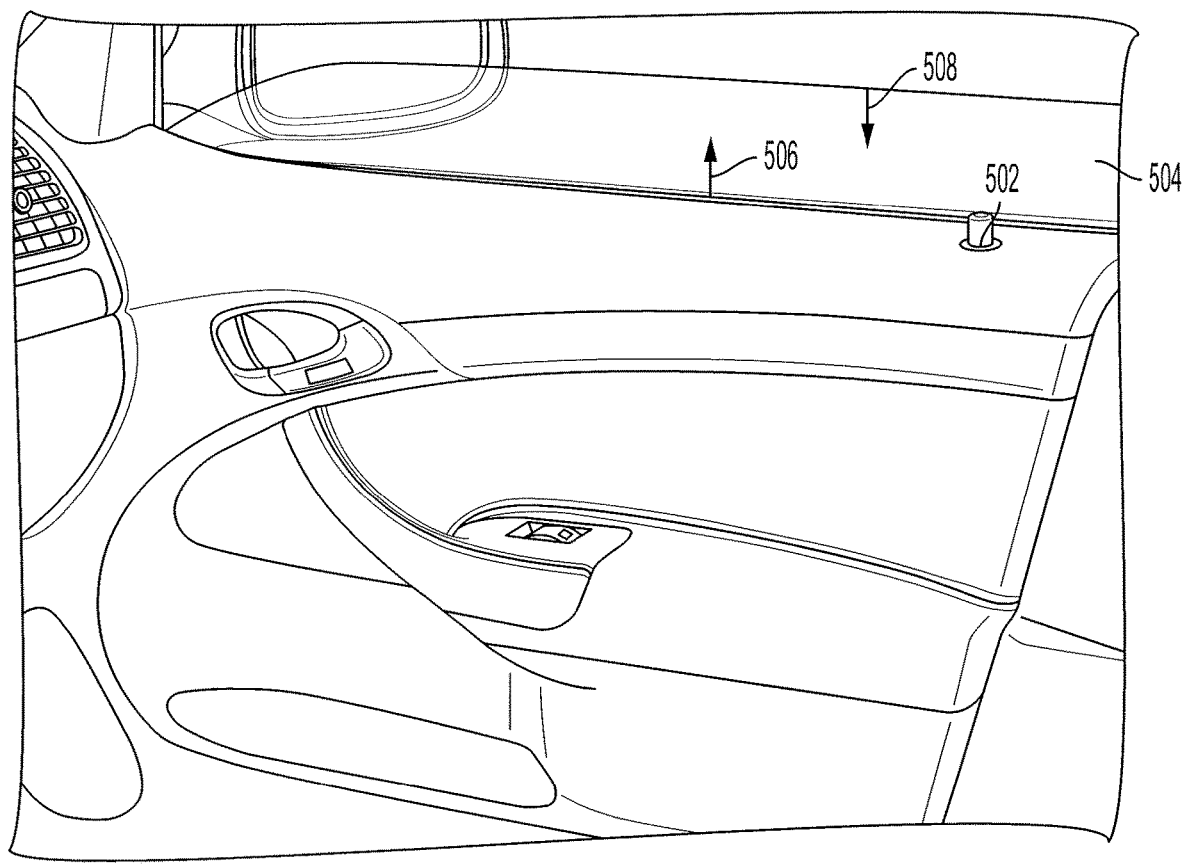
FIG. 5 shows the control of one or more doors and/or windows using the infotainment system of FIG. 1 according to an aspect of the invention.

For example, the infotainment platform 102 may control the one or more doors, as shown in FIG. 5 for example, to engage or lock the door lock 502 or to disengage or unlock the door lock 502. The command request may additionally specify a specific door, such as a front passenger-side door, front driver-side door, rear passenger-side door, rear driver-side door or trunk door to control, and/or specify the specific setting or task to perform, such as to lock or unlock the specified door.

In another example, the infotainment platform 102 may open, partially open, partially close or close the window 504 (which may, e.g., move, respectively, in a first direction 506 or in a second direction 508). The command request may additionally specify a specific window, such as the sunroof, the front passenger-side window, the front driver-side window, the rear passenger-side window and/or the rear driver-side window to control, and/or specify the specific setting or task to perform, such as to partially open, open, close or partially close the specified window a specific amount, such as approximately 50%.

Figure 6:
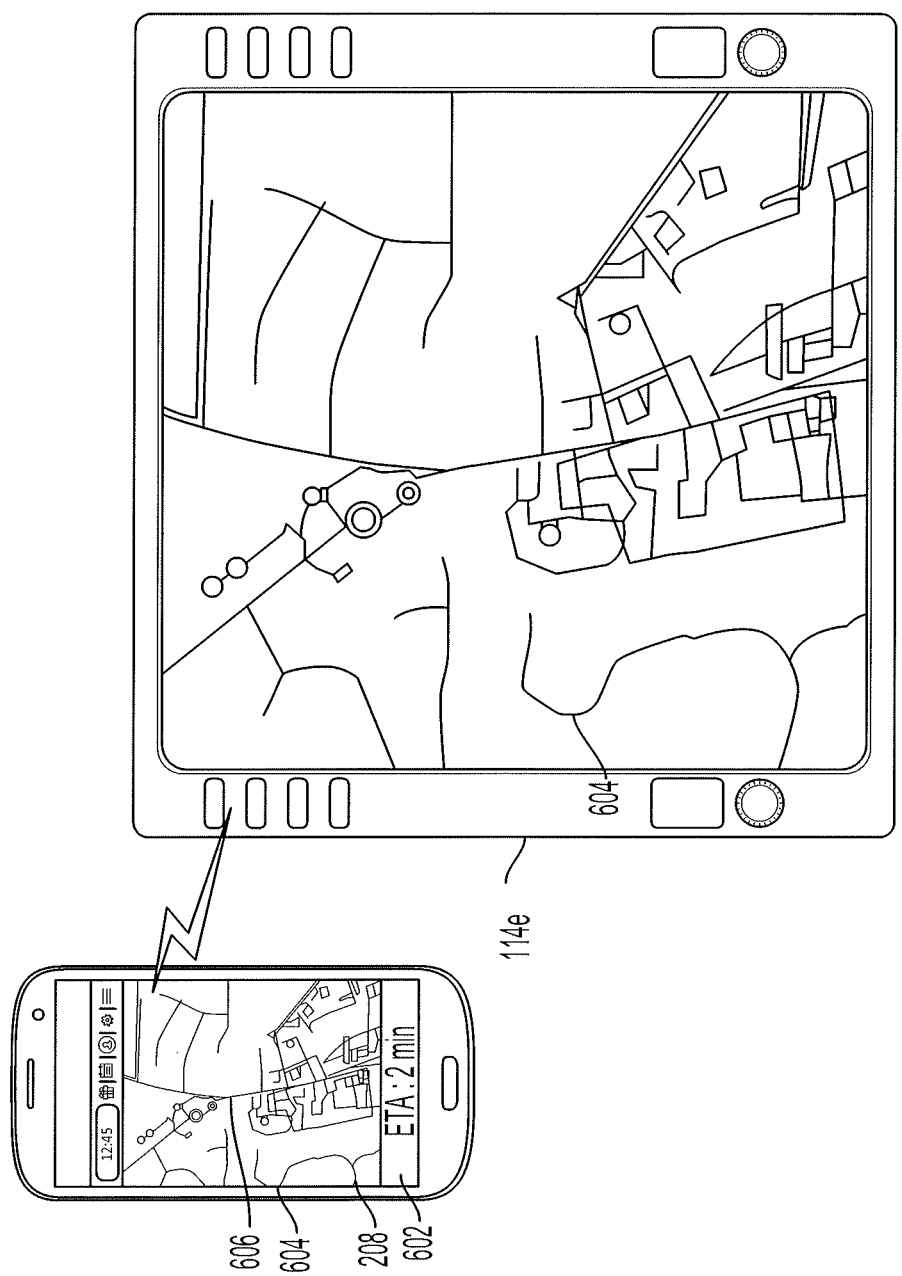
FIG. 6 shows the control of the navigation unit and/or the one or more user interfaces using the infotainment system of FIG. 1 according to an aspect of the invention.

Other examples of controlling one or more vehicle components include the use and control of the navigation unit 114*c* and/or the user interface 114*e*, as shown in FIG. 6 for example. The one or more user devices 104*a-b* may load a map 604 of the surrounding area of the vehicle 112 onto the user interface 208 of the one or more user devices 104*a-b*. The user interface 208 may receive input from the user and display a route 606 that includes a start location, a destination location and a path of the vehicle 112 along the route 606. The user device 104*a-b* may share the route 606 along with the map 604 with the infotainment platform 102 to display on the user interface 114*e* of the infotainment platform 102. Similarly, the infotainment platform 102 may receive input from the user and display the route 606 and map 604 onto the user interface 114*e* and share the route 606 and the map 604 with the one or more user devices 104*a-b* to display on the user interface 208.

Other information, such as an estimated time of arrival (ETA) 602 may be calculated and displayed on the one or more user devices 104*a-b*. The one or more user devices 104*a-b* may share the map 604 along with the route 606 onto the user interface 114*e* of the infotainment platform 102 or vice versa. In some implementations, the infotainment platform 102 and/or the one or more user devices 104*a-b* may render, mirror and/or otherwise share other images, webpages and/or resources with the infotainment platform 102 and/or among the one or more user devices 104*a-b*. In some implementations, the infotainment platform 102 may act as a gateway that allows two or more user devices 104*a-b* to communicate among each other. For example, one user device 104*a* may send an image, such as a resource or webpage, or communicate, such as using the microphone and speaker of the user device 104*a*, to another user device 104*b* or to the driver via the user interface 114*e* on the infotainment platform 102.

Figure 7:
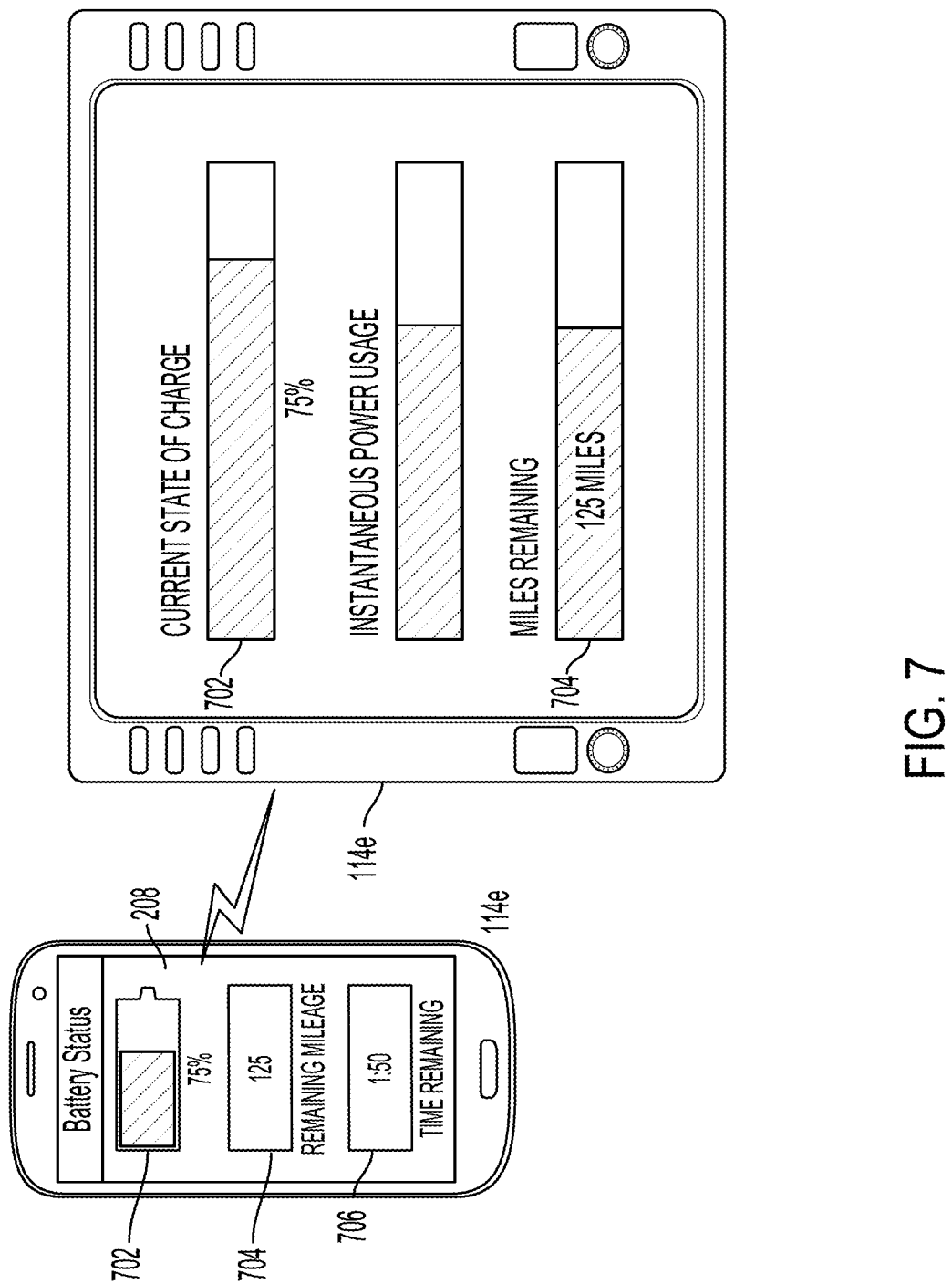
FIG. 7 shows the monitoring of status information and/or sensor data related to the battery using the infotainment system of FIG. 1 according to an aspect of the invention.

In another example, the infotainment platform 102 may provide to the one or more user devices 104*a-b* the sensor data and/or status information to be displayed on the user interface 208. The one or more user devices 104*a-b* may display the sensor data and/or status information that the infotainment platform 102 measures, detects, and/or obtains from one or more other vehicle components 110 of the vehicle 112 via one or more sensors 122. The sensor data and/or status information may include information related to the battery 128, such as from the battery sensor 122*a*, as shown in FIG. 7 for example, the engine 124, such as from the engine sensor 122*b*, or other components of the vehicle 112. The sensor data and/or the sensor information obtained from the battery sensor 122*a* related to the battery 128 may include displaying a current state of charge 702 of the battery 128, a remaining mileage 704 before the vehicle 112 is empty and/or an estimated time remaining 706 before the vehicle 112 is empty and/or other sensor data or status information.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An in-vehicle infotainment system for a vehicle, comprising:
an in-vehicle infotainment platform including:
a network access device configured to communicate with a plurality of remote devices including a first remote device and a second remote device, and as a gateway to enable communication amongst the plurality of remote devices, and
an electronic control unit coupled to the network access device and configured to:
receive, via the network access device, first data indicative of a first request from the first remote device to control, adjust or manage a vehicle component,
receive, via the network access device, second data indicative of a second request from the first remote device to send an image, a map, and/or a webpage to the second remote device,
control, adjust or manage the vehicle component based on the first request, and
send, via the network access device, the image, the map, and/or the webpage to the second remote device based on the second request.

2. The in-vehicle infotainment system of claim 1, wherein the first request is a request to change an ambient temperature within a passenger cabin within the vehicle, wherein the vehicle component includes a heating, ventilation and air conditioning (HVAC) unit.

3. The in-vehicle infotainment system of claim 2, wherein to control, adjust or manage the vehicle component the electronic control unit is configured to increase or decrease the ambient temperature within the passenger cabin.

4. The in-vehicle infotainment system of claim 2, wherein the electronic control unit is further configured to receive data indicative of another request from the first remote device to control, adjust or manage a second vehicle component, wherein the another request is a request to unlock or lock one or more doors, control a setting of a media center system within the vehicle or open or close one or more windows, wherein the second vehicle component is the one or more doors, the media center system or the one or more windows, wherein to control, adjust or manage the second vehicle component the electronic control unit is configured to unlock or lock the one or more doors, control the setting of the media center system or open or close the one or more windows.

5. The in-vehicle infotainment system of claim 1, wherein the first request includes an identifier that identifies that the vehicle component is to be controlled, adjusted or managed and a setting or a configuration to set or configure the vehicle component.

6. The in-vehicle infotainment system of claim 5, wherein the electronic control unit is further configured to:
extract the identifier and the setting or the configuration to set or configure the vehicle component; and
control, adjust or manage the vehicle component based on the setting or the configuration.

7. The in-vehicle infotainment system of claim 1, wherein the first request is a request to render an image on the vehicle component, wherein the vehicle component is a display, wherein to control, adjust or manage the vehicle component the electronic control unit is configured to render the image on the display.

8. The in-vehicle infotainment system of claim 1, wherein the electronic control unit is further configured to:
provide vehicle status information or vehicle navigation information to the first remote device.

9. The in-vehicle infotainment system of claim 1, wherein the electronic control unit is further configured to:
receive data indicative of another request to control a second vehicle component from the second remote device.

10. An in-vehicle infotainment system for a vehicle, comprising:
an in-vehicle infotainment platform including:
a network access device configured to communicate with a plurality of remote devices including a first remote device and a second remote device, and as a gateway to enable communication amongst the plurality of remote devices, and
a processor configured to:
receive, via the network access device, first data indicative of a first request from the first remote device to control, adjust or manage a vehicle component,
receive, via the network access device, second data indicative of a second request from the first remote device to send a communication generated by a microphone of the first remote device to the second remote device,
control, adjust or manage the vehicle component based on the first request, and
send, via the network access device, the communication to the second remote device based on the second request.

11. The in-vehicle infotainment system of claim 10, wherein the first request is a request to change an ambient temperature within a passenger cabin within the vehicle, wherein the vehicle component includes a heating, ventilation and air conditioning (HVAC) unit, wherein to control the vehicle component the processor is configured to increase or decrease the ambient temperature within the passenger cabin.

12. The in-vehicle infotainment system of claim 11, wherein the processor is further configured to receive data indicative of another request from the first remote device to control a second vehicle component, wherein the another request is a request to unlock or lock one or more doors, control a setting of a media center system within the vehicle or open or close one or more windows, wherein the second vehicle component is the one or more doors, the media center system or the one or more windows, wherein to control the second vehicle component the processor is configured to unlock or lock the one or more doors, control the setting of the media center system or open or close the one or more windows.

13. The in-vehicle infotainment system of claim 10, wherein the first request includes an identifier that identifies that the vehicle component is to be controlled.

14. The in-vehicle infotainment system of claim 10, wherein the processor is further configured to:
provide vehicle status information or vehicle navigation information to the first remote device.

15. The in-vehicle infotainment system of claim 14, wherein the vehicle status information includes a state of charge of a battery within the vehicle, wherein the vehicle navigation information includes a current location of the vehicle, an estimated time of arrival, a route of the vehicle or a map of the current location and the route of the vehicle.

16. A method for controlling an in-vehicle infotainment unit within a vehicle, comprising:
obtaining, by a processor via a network access device, first data indicative of a first request from a first remote device to control a vehicle component and
obtaining, by the processor via the network access device, second data indicative of a second request from the first remote device to send an image, a map, and/or a webpage to a second remote device;
controlling, by the processor, the vehicle component based on the first request, and
sending, by the processor via the network access device, the image, the map, and/or the webpage to the second remote device based on the second request.

17. The method of claim 16, wherein the first remote device is different from the second remote device.

18. The method of claim 16, wherein the first request is a request to change an ambient temperature within a passenger cabin within the vehicle, wherein the vehicle component includes a heating, ventilation and air conditioning (HVAC) unit.

19. The method of claim 18, wherein controlling the vehicle component includes increasing or decreasing the ambient temperature within the passenger cabin.

20. The method of claim 16, further comprising:
providing vehicle status information or vehicle navigation information to the first remote device.

* * * * *